J. H. Irwin.
Velocipede.
No. 86,405. Patented Feb. 2, 1869.

Witnesses.
H. Beale
R. S. Turner

Inventor.
J. H. Irwin

JOHN H. IRWIN, OF PHILADELPHIA, PENNSYLVANIA.

*Letters Patent No. 86,405, dated February 2, 1869.*

IMPROVEMENT IN VELOCIPEDES.

The Schedule referred to in these Letters Patent and making part of the same

*To all whom it may concern:*

Be it known that I, JOHN H. IRWIN, of Philadelphia, in the county of Philadelphia, and State of Pennsylvania, have invented a new and useful Improvement in Velocipedes; and I do hereby declare the following to be a full, clear, and exact description of the same, reference being had to the accompanying drawings, in which—

Similar letters indicate corresponding parts in all the figures.

Among all the improvements in velocipedes which have been patented, or which I have observed, wherein the motive-power is applied to the guide-wheel, there is great difficulty in turning, while under speed, and it is necessary to lessen the speed in order to save the rider from being thrown from his seat in making quick turns; and it is also necessary to make long turns, in order to keep the wheel, or shield, if there is one, from throwing him off. Both of these disadvantages are serious faults, which my invention obviates.

It is also to be noted that heretofore there has been no provision for applying more than one complete propelling-apparatus to a velocipede, which is also an object of this invention.

The nature of my invention consists, first, in the employment of the rider's seat, for steering the velocipede, and, second, in the application of two or more distinct propelling-apparatus to the wheels of the velocipede.

The drawings represent a three-wheel velocipede, provided with my improvements—

A designating the front or guide-wheel;

B, its guide-frame and shield;

C, the rider's seat;

D, a hand-support;

E, the brace which connects the guide-wheel or frame with the rear wheels and their frame;

G and H, the two rear wheels;

L, a seat for another rider; and

M, a hand-support for the rear rider.

The rider's seat C is connected with the guide-frame B, so as to swivel or swing laterally therewith.

Figure 3:
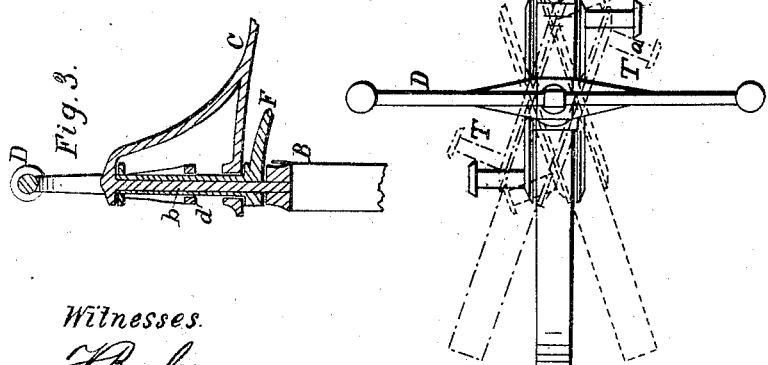
Figure 3 is a vertical section of a part detached.

The method of forming this construction is shown in the section, fig. 3.

A pivot-bolt, *b*, forms the direct connection, and turns in a socket, *d*, on the front end of the connecting-brace F.

To the upper end of the socket *d* is secured a transverse stationary hand-support, D.

With this construction, the driver's seat C turns the guide-frame B of the front wheel A, as it moves transversely, in either direction, so that the driver not only guides the velocipede thereby, but, changing his position simultaneously with the guide-wheel, or its shield, the latter can have no tendency to throw him off in turning a curve, however short, his legs always keeping parallel therewith.

In employing the seat thus to guide the wheel, the stationary hand-support is made use of in connection with it, in order to furnish, as it were, a fixed fulcrum, by which to produce and control the movements of the seat.

Figure 1:
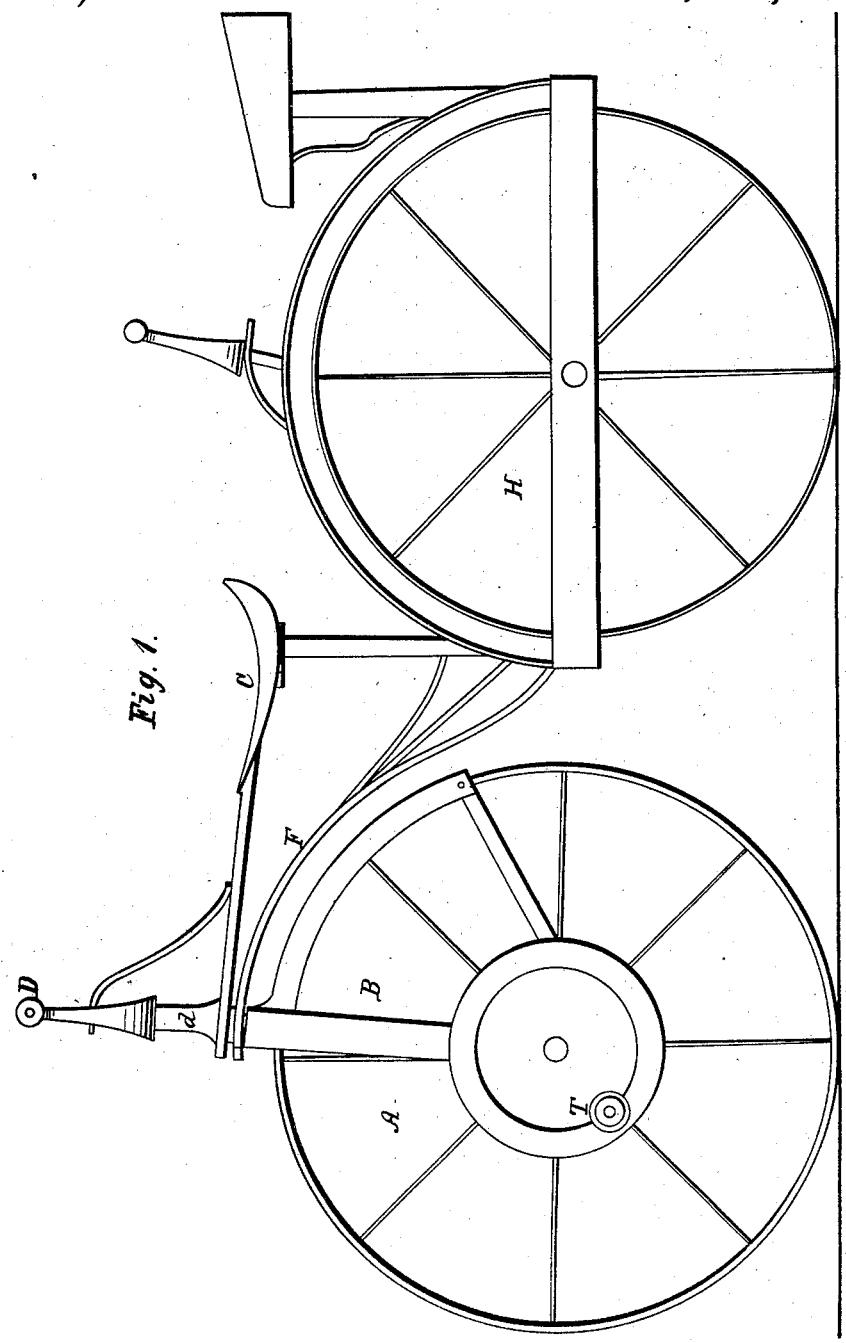
Figure 1 represents a side elevation of the velocipede.
Figure 2:
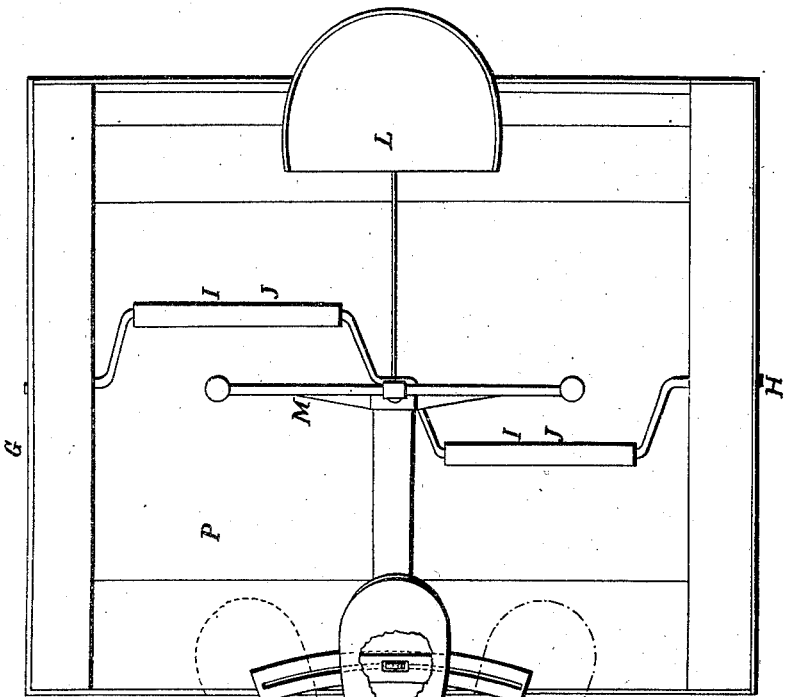
Figure 2 is a plan or top view of the same.

Thus, as the driver grasps the hand-support with his two hands, if he wishes to turn the velocipede in either direction, he pulls on the opposite end of the hand-support, and draws the seat to that side, thereby producing the desired effect. The movements are illustrated in fig. 2. When it is desired to turn the velocipede to the right, the rider pulls upon the left end of the hand-support, and draws the seat toward the position shown by red lines; and when the velocipede is to be turned to the left, he pulls upon the right end of the hand-support, and draws the seat toward the position shown by the blue lines in fig. 2.

This method of steering might be applied to a two-wheel velocipede.

In addition to the usual propelling-cranks I I, on the front wheel, I employ a set of cranks, J J, or propelling-apparatus, mounted in the rear frame P, for turning one of the rear wheels, as G, the other wheel, H, (in this three-wheel velocipede,) being left free, in order to allow the velocipede to turn. Hence, if an additional rider occupies the rear seat L, he can move the cranks J J, and thereby perform his share of propelling the velocipede. The hand-support N assists him in the operation. By this means it becomes as practicable and easy for two persons to ride one velocipede, as for a single person; and even a third person might have a seat with the rear rider, and assist in propelling the wheel G.

This principle of additional and distinct propelling-apparatus might be extended still further, and a velocipede might be constructed of a larger number of wheels, accommodating several persons, each having a propelling-apparatus, if desired.

What I claim as my invention, and desire to secure by Letters Patent, is—

The rider's seat C, secured to the frame B, and operating in conjunction therewith, by means of which said seat forms the steering-apparatus of the velocipede, substantially as and for the purpose herein specified.

Also, the two distinct propelling-apparatus applied to the front and hind wheels of the velocipede, as and for the purpose set forth.

J. H. IRWIN.

Witnesses:
J. S. BROWN,
R. S. TURNER.